United States Patent
Chen

(10) Patent No.: US 9,264,469 B2
(45) Date of Patent: Feb. 16, 2016

(54) METHOD AND BASE STATION FOR SYNCHRONIZING SIGNALING MESSAGE

(75) Inventor: Yu Chen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 380 days.

(21) Appl. No.: 12/866,116

(22) PCT Filed: Feb. 4, 2008

(86) PCT No.: PCT/CN2008/000315
§ 371 (c)(1),
(2), (4) Date: Aug. 4, 2010

(87) PCT Pub. No.: WO2009/100577
PCT Pub. Date: Aug. 20, 2009

(65) Prior Publication Data
US 2010/0315988 A1    Dec. 16, 2010

(51) Int. Cl.
*H04H 20/71* (2008.01)
*H04L 29/06* (2006.01)
*H04W 72/00* (2009.01)

(52) U.S. Cl.
CPC ............ *H04L 65/4076* (2013.01); *H04L 69/28* (2013.01); *H04W 72/005* (2013.01)

(58) Field of Classification Search
CPC ........ H04W 24/00; H04W 28/10; H04W 4/06
USPC ................... 370/254, 312, 437; 455/450, 466
See application file for complete search history.

(56) References Cited

U.S. PATENT DOCUMENTS

| | | | | |
|---|---|---|---|---|
| 6,370,132 | B1* | 4/2002 | Saxena | 370/338 |
| 7,499,700 | B2* | 3/2009 | Dillon et al. | 455/423 |
| 7,536,622 | B2* | 5/2009 | Leon et al. | 714/748 |
| 7,734,762 | B2* | 6/2010 | Hundscheidt et al. | 709/224 |
| 2008/0008152 | A1* | 1/2008 | Lohr et al. | 370/342 |
| 2008/0291866 | A1* | 11/2008 | Fukui | 370/328 |
| 2010/0315988 | A1* | 12/2010 | Chen | 370/312 |

FOREIGN PATENT DOCUMENTS

| | | | |
|---|---|---|---|
| CN | 1585316 A | 2/2005 | |
| CN | 10104364 A | 9/2007 | |
| WO | WO 2005/018116 A1 * | 8/2003 | H04B 7/26 |
| WO | WO2007029708 A1 | 3/2007 | |

(Continued)

OTHER PUBLICATIONS

Extended European Search Report dated Feb. 4, 2012; Date of Completion of Search Mar. 19, 2012, 8 pgs.

(Continued)

*Primary Examiner* — Raj Jain
(74) *Attorney, Agent, or Firm* — Fay Sharpe LLP

(57) ABSTRACT

According to the invention, it provides a method for synchronizing a signaling message transmitted over multi-cell MCCH. The method comprises the following steps: transmitting, by a gateway, the signaling message carried with activation time information to a base station via a MCE (MBMS Control Entity), or transmitting, by a MCE, the signaling message carried with activation time information directly to a base station; and making, by the base station, the signaling message take effect synchronously based on the activation time information contained in the signaling message.

17 Claims, 2 Drawing Sheets

(56) References Cited

FOREIGN PATENT DOCUMENTS

| WO | WO 2007/148187 A1 * | 12/2007 | ............... H04B 7/26 |
|---|---|---|---|
| WO | WO2007148187 A1 | 12/2007 | |

OTHER PUBLICATIONS

Siemens: "Discussion on E-MBMS MCE Functionalities" 3GPP Draft; R3-061833_MCE Functions, $3^{rd}$ Generation Partnership Project (3GPP), Mobile Competence Centre; 650, Route Des Lucioles; F-06921 Sophia-Antipolis Cedex; France, vol. RAN WG3, no. Riga, Latvia; Nov. 1, 2006, XP050160714, [retrieved on Nov. 1, 2006]; 3 pgs.

Alcatel-Lucent: "E-MBMS Service multiplexing, Scheduling and data handling" Document: Discussion & decision, 3GPP Draft; R2-075048 E-MBMS Service Multiplexing Scheduling and Data Handling, $3^{rd}$ Generation Partnership Project (3GPP), Mobile Competence Centre; 650; Route Des Lucioles; F-06921 Sophia-Antipolis Cedex; France, vol. RAN WG2, no. Jeju; Nov. 12, 2007, XP050137525, [retrieved on Nov. 12, 2007], 6 pgs.

Alcatal-Lucent: "Synchronization issue for E-MBMS signaling" 3GPP Draft; R3-080225 Synchronization Issue for E-MBMS Signalling, $3^{rd}$ Generation Partnership Project (3GPP), Mobile Competence Centre; 650, Route Des Lucioles; F-06921 Sophia-Antipolis Cedex; France, vol. RAN WG3, no. Sorrento, Italy Feb. 5, 2008, XP050163441, [retrieved on Feb. 5, 2008], 3 pgs.

International Search Report for PCT/CN2008/000315.

Nokia Siemens Networks, "Clean up and update on security, scheduling, mobility, MBMS and DRX," 3GPP TSG-RAN2 Meeting #60, R2-075498, Jeju, South Korea, Nov. 5-9, 2007, 116 pages.

* cited by examiner

METHOD AND BASE STATION FOR SYNCHRONIZING SIGNALING MESSAGE

FIELD OF THE INVENTION

The invention relates to wireless communication field, specifically relates to a method and a base station for synchronizing a signaling message transmitted over multi-cell MCCH (MBMS Control Channel), capable of ensuring synchronization of the signaling message in a simple manner in case of delay variation.

BACKGROUND OF THE INVENTION

In a MBMS (Multimedia Broadcast Multicast Service) system, 3GPP (Third Generation Partner Project) has agreed multi-cell MBSFN (MBMS Single Frequency Network) transmission of MCCH. Thus, a mechanism is needed to ensure the MCCH synchronization. Parameters such as MSAP (MBMS Subframe Allocation Pattern) allocated by a MCE (MBMS Control Entity) should be synchronized at different eNBs (base stations) for the sake of user plane content synchronization.

There is an existing proposal in 3GPP RAN3 (Radio Access Network, task group 3), wherein a new AMBR (Aggregate Maximum Bit Rate) to the eNB is needed to be activated simultaneously, so that all the eNBs can make a scheduling according to the new AMBR at the same time. This can be done by a simple mechanism wherein a time stamp indicating for example the next scheduling interval is carried inside a Session Update message. Such a procedure is also needed when there is change for a single service carried on a GBR (Guaranteed Bit Rate) bearer.

However, there are the following defects in the above proposal.
1) In the above proposal, only the Session Update message is mentioned. However, there are a lot of other messages over M2 and M3 interfaces.
2) The proposal is based on a time stamp, e.g. scheduling period, which relates to a user plane idea, different from controlling information element in the invention as described hereinafter. On the other hand, the scheduling period may not be suitable for a GW (gateway) because the GW does not know the scheduling information.
3) There is no description about how eNB responds to the activation time information in the above proposal.
4) How to set the activation time information is not mentioned in the above proposal.

SUMMARY OF THE INVENTION

To overcome the defects in prior art, the invention is provided. Therefore, one aim of the invention is to provide a method and a base station for synchronizing a signaling message transmitted over multi-cell MCCH, capable of ensuring synchronization of the signaling message in a simple manner in case of delay variation.

In order to achieve the above aim, the invention provides a method for synchronizing a signaling message transmitted over multi-cell MCCH (MBMS Control Channel). The method comprises: transmitting, by a gateway, a signaling message carried with activation time information to a base station via a MCE (MBMS Control Entity), or transmitting, by a MCE, the signaling message carried with activation time information directly to a base station; and making, by the base station, the signaling message take effect synchronously based on the activation time information contained in the signaling message.

Preferably, the signaling message includes: a session start/stop message, a MCCH configuration/reconfiguration message, a radio resource allocation/reallocation message, a radio bearer configuration/reconfiguration message and a counting message.

Preferably, transmitting by the gateway the signaling message to the base station via the MCE comprises the following steps: transmitting, by the gateway, the signaling message to the MCE via a M3 interface; and transmitting, by the MCE, the signaling message to the base station via a M2 interface.

Preferably, the MCE is located outside of the base station.

Preferably, the MCE is located within the base station.

Preferably, the method further comprises the following steps: making, by the base station, the signaling message take effect synchronously at time indicated by the activation time information contained in the signaling message; and transmitting, by the base station, a corresponding air interface message to a mobile station in a next modification period after the time indicated by the activation time information contained in the signaling message.

Preferably, the method further comprises the following steps: making, by the base station, the signaling message take effect synchronously at time indicated by the activation time information contained in the signaling message; and transmitting, by the base station, a corresponding air interface message to a mobile station at the time indicated by the activation time information contained in the signaling message.

Preferably, the method further comprises the following steps: making, by the base station, the signaling message take effect synchronously at start of a next modification period after the time indicated by the activation time information contained in the signaling message; and transmitting, by the base station, a corresponding air interface message to a mobile station in a next modification period after the time indicated by the activation time information contained in the signaling message.

In addition, according to the invention, it provides a base station for synchronizing a signaling message transmitted over multi-cell MCCH (MBMS Control Channel). The base station comprises: receiving means configured to receive the signaling message carried with activation time information which is transmitted by a gateway via a MCE (MBMS Control Entity) or is transmitted directly by a MCE; and synchronization means configured to make the signaling message take effect synchronously based on the activation time information contained in the signaling message.

Preferably, the signaling message includes: a session start/stop message, a MCCH configuration/reconfiguration message, a radio resource allocation/reallocation message, a radio bearer configuration/reconfiguration message and a counting message.

Preferably, the receiving means receives the signaling message from the MCE via a M2 interface.

Preferably, the MCE is located outside of the base station.

Preferably, the MCE is located within the base station.

Preferably, the base station further comprises: effecting means configured to make the signaling message take effect synchronously at time indicated by the activation time information contained in the signaling message; and transmitting means configured to transmit a corresponding air interface message to a mobile station in a next modification period after the time indicated by the activation time information contained in the signaling message.

Preferably, the base station further comprises: effecting means configured to make the signaling message take effect synchronously at time indicated by the activation time information contained in the signaling message; and transmitting means configured to transmit a corresponding air interface message to a mobile station at the time indicated by the activation time information contained in the signaling message.

Preferably, the base station further comprises: effecting means configured to make the signaling message take effect synchronously at start of a next modification period after the time indicated by the activation time information contained in the signaling message; and transmitting means configured to transmit a corresponding air interface message to a mobile station in a next modification period after the time indicated by the activation time information contained in the signaling message.

DETAILED DESCRIPTION OF PREFERRED EMBODIMENTS

Figure 1:
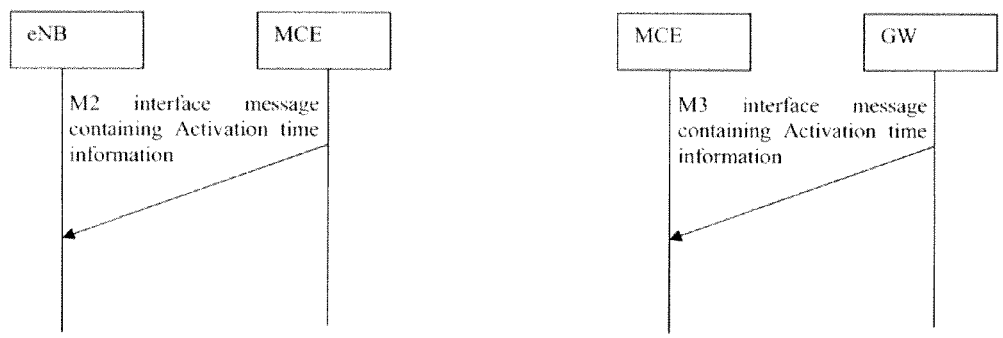
FIG. 1 is a schematic diagram illustrating forwarding of a signaling message carried with activation time information from GW to MCE and from MCE to eNB via a M2/M3 interface.
Figure 2:
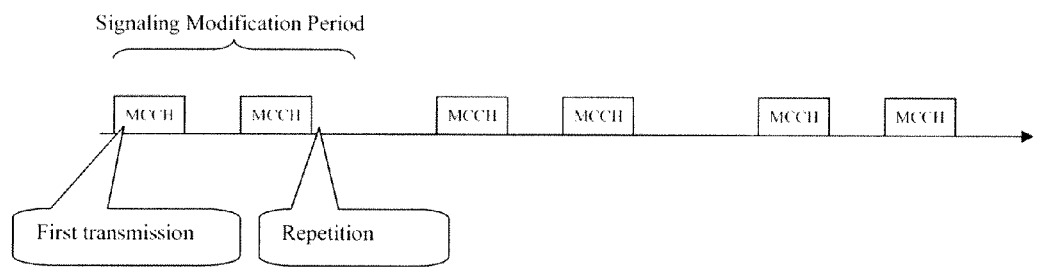
FIG. 2 is a schematic diagram illustrating effecting of the signaling based on a signaling modification period.

Embodiments of the invention will be described below in connection with the figures.

The basic concept of the invention is described as below.

The message sent over M2/M3 interface carries activation time information. The eNB responds to the activation time information according to a mechanism of the present invention.

It is decided by 3GPP RAN2 that E-MBMS (Evolved MBMS) air interface signaling can be carried on a multi-cell P-MCCH (Primary MCCH) and multi-cell S-MCCH (Secondary MCCH). The multi-cell transmission is required to be synchronized among different eNBs. If de-synchronization of multi-cell transmission of signaling occurs, it may cause severe problem for UE (User Equipment) reception of data. On the other hand, if the network needs to update parameters, the update should take effect at the eNBs simultaneously; otherwise data synchronization may be destroyed.

The control information that may need to be synchronized at the M2/M3 interface includes:

1) Session start/stop messages which can include other control information such as resource reference information, and which are forwarded over the M3 and M2 interfaces in case that the MCE is located outside of the eNB The messages may impact the service list, which may be carried on the multi-cell P-MCCH, and requires action information of the MCCH. Configuration of the MTCH (MBMS Service Channel) of the service would correspondingly appear in the multi-cell S-MCCH.

2) Configuration/reconfiguration message of MCCH (e.g. regarding the number of S-MCCHs) which is forwarded over the M2 interface It includes creation or release of multicell MCCH for MCE synchronization.

3) Radio resource allocation message for E-MBMS services from MCE, which is forwarded over M2

For example, MCE updates a radio resource allocation/reallocation message of MSAP.

4) Radio bearer configuration/reconfiguration message for E-MBMS services by the MCE, which is forwarded over M2

The radio bearer configuration message carries air interface radio bearer parameters, which may impact on content of multi-cell S-MCCH, as well as data synchronization.

5) Other signaling

Other signaling relates to other M2/M3 signaling such as counting signaling that needs to be synchronized, research of which may be done in the future. Counting signaling may be configured by the MCE and can be transmitted in a multi-cell synchronization transmission mode. If it is so, synchronization of the counting signaling is required.

The main difference between the E-MBMS signaling and the data is that reliable transmission (via M2/M3 interface) needs to be ensured for signaling transmission. That is, there is no packet loss over the M2/M3 interface, so that there is no need to have resynchronization. On the other hand, there is no segmentation and concatenation issue for signaling, because the messages are organized in a pre-defined format (e.g. which IEs (Information Elements) should be in the same message) by a RRC (Radio Resource Control) protocol.

Hence, the synchronization issues for signaling messages involve:

Identical radio bearer configuration for multi-cell MCCH transmission

Delay variation over M2/M3, resulting in different effecting time

Identically processing in eNBs

The synchronization issues are described respectively hereinafter.

Identical Radio Bearer Configuration for Multi-Cell MCCH Transmission

It is a quite straightforward problem. Similar to the MTCH, it can be implemented by an OMC (Operation Maintenance Center) or MCE based on resource blocks or RB (radio bearer) parameters. The RRC signaling would specify the IE format, transmission sequence of messages and how to map the messages to channels.

Delay Variation over M2/M3

The main issue of signaling synchronization is to handle the delay variation over the M2/M3 interface, so that the signaling takes effect at different eNBs simultaneously. As shown in the FIG. 1, in the present invention, every signaling message carries activation time information, indicating to the eNBs when the signaling message takes effect. An example is to update the MSAP. The time can be a reference to GPS (Global Positioning System) time. The activation time can be determined as follows:

$$T_{act} = T_{current} + \text{Max\_delay}$$

$T_{act}$ indicates activation time; $T_{current}$ indicates a current time of a sender; and Max_delay indicates a maximum delay between the sender and an eNB interface. When the MCE is located within the eNB, the sender is a GW. When the MCE is located outside of the eNB, the sender is a MCE.

Currently, there are two MCE deployment options:
* MCE in eNB

In this option, only the first type of control information, i.e. session start/update/stop messages, will be used. Hence, the synchronization is required over the M3 interface.
*MCE Outside eNB In this option, all the five types of control information as mentioned above would be transmitted or forwarded from MCE to eNB over M2. Thus, M2 synchronization is needed. For a simplified signaling structure, the GW may insert the activation time information for any of the MCE deployments. When the MCE receives the session management message containing the activation time information inserted by the GW, the MCE may ignore it or update it if necessary.

In conclusion, all the signaling messages of the M2 or M3 interface need to carry the activation time information. For a session start/update/stop message, GW adds the activation time information into the message and allows the MCE to change it.

eNB's Behaviors when Receiving the Activation Time Information

RRC messages may be transmitted periodically due to UE DRX (Discontinuous Reception). Different messages may have different lengths of Modification Period (MP), which is similar to 3GPP Rel-6 (release 6). Hence, although the activation time expires, the air interface signaling may be transmitted from the next MP. There are the following three modes in the present invention.

1. The signaling takes effect at the time indicated by the "activation time information" inside eNB, but the air interface message is unchanged. The eNB transmits a corresponding air interface message to a UE (i.e., a mobile station) in a next modification period after the time indicated by the activation time information.

This may cause mismatch between the eNB and the UE, since the eNB and the UE may use different configuration from the time indicated by the activation time information to the next modification period.

2. The signaling takes effect at the time indicated by "activation time information" inside eNB, and the air interface message is sent to UE at the time indicated by the activation time information.

This will affect the DRX of the UE reception and an additional mechanism for UE wake up is needed.

3. The signaling takes effect at a start time of a next modification period after the time indicated by the activation time information inside eNB, and the air interface message is transmitted to the UE in a next modification period after the time indicated by the activation time information.

The method of the mode 3) is preferred for simplicity.

Hence, it needs specify that the signaling shall take effect from start of next MP after the expiration of the activation time, and a corresponding message is transmitted to the UE.

Figure 3:
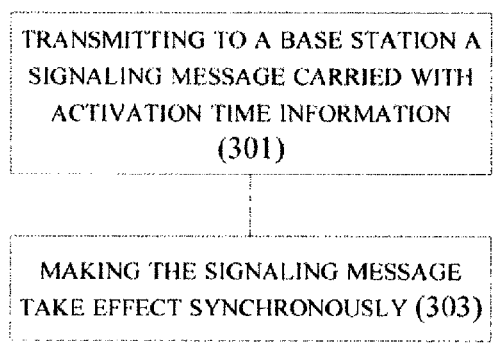
FIG. 3 is a diagram illustrating an operation flow of the method for synchronizing the signaling message according to the present invention.

As shown in the FIG. 3, at step 301, a gateway transmits a signaling message carried with activation time information to a base station via a MCE. At step 303, the eNB makes the signaling message take effect synchronously based on the activation time information contained in the signaling message.

Figure 4:
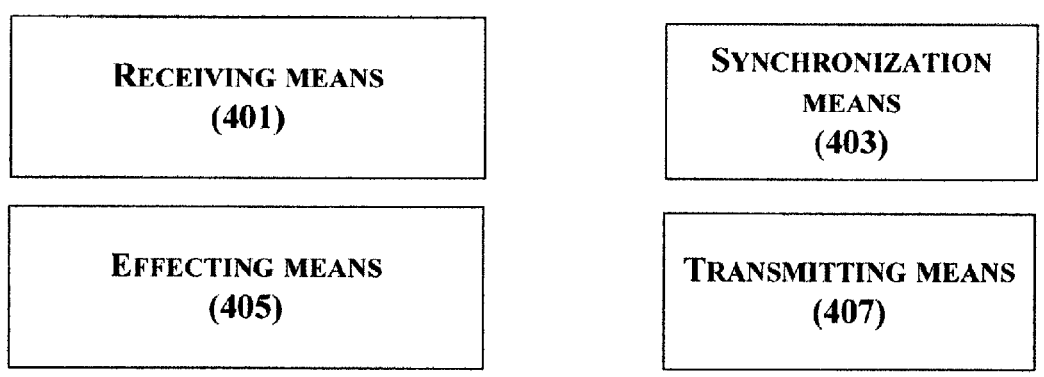
FIG. 4 is a block diagram illustrating the eNB for synchronizing the signaling message according to the present invention.

FIG. 4 is a block diagram illustrating the eNB for synchronizing the signaling message according to the present invention.

As shown in the FIG. 4, the eNB comprises receiving means 401, synchronization means 403, effecting means 405 and transmitting means 407. The receiving means 401 is configured to receive the signaling message carried with activation time information from a gateway via a MCE. The synchronization means 403 is configured to make the signaling message take effect synchronously based on the activation time information contained in the signaling message. The effecting means 405 and the transmitting means 407 cooperatively operate to perform any of the three modes as described in "eNB's behaviors when receiving the activation time information", the details of which are omitted here.

Though the invention has been illustrated in connection with the preferred embodiments of the present invention as above, those skilled in the art will appreciate that any modifications, substitutions and improvements to the present invention are possible without departing from the spirit and scope of the present invention. Thus, the present invention is not limited to the above embodiments, but should be defined by the attached claims and its equivalent.

What is claimed is:

1. A method for synchronizing a signaling message transmitted over multi-cell MCCH (MBMS Control Channel), comprising:
   receiving, from a gateway, the signaling message carried with activation time information at a base station via a MCE (MBMS Control Entity), or receiving, directly from a MCE, the signaling message carried with activation time information directly to a base station; and
   making, by the base station, the signaling message take effect in the base station synchronously at a time indicated by the activation time information contained in the signaling message;
   wherein receiving from the gateway the signaling message at the base station via the MCE comprises:
      receiving, from the gateway, the signaling message at the MCE via a M3 interface; and
      receiving, from the MCE, the signaling message at the base station via a M2 interface.

2. The method as defined in the claim 1, wherein the signaling message includes: a session start/stop message, a MCCH configuration/reconfiguration message, a radio resource allocation/reallocation message, a radio bearer configuration/reconfiguration message and a counting message.

3. The method as defined in the claim 1, wherein the MCE is located outside of the base station.

4. The method as defined in the claim 1, wherein the MCE is located within the base station.

5. The method as defined in the claim 1, further comprising:
   transmitting, by the base station, a corresponding air interface message to a mobile station in a next modification period after the time indicated by the activation time information contained in the signaling message.

6. The method as defined in the claim 1, further comprising:
   transmitting, by the base station, a corresponding air interface message to a mobile station at the time indicated by the activation time information contained in the signaling message.

7. A base station for synchronizing a signaling message transmitted over multi-cell MCCH (MBMS Control Channel), comprising:
   a receiver configured to receive the signaling message carried with activation time information from a gateway via a MCE (MBMS Control Entity) or directly from a MCE;
   a processor configured to make the signaling message take effect in the base station synchronously at a time indicated by the activation time information contained in the signaling message, wherein the signaling message includes: a session start/stop message, a MCCH configuration/reconfiguration message, a radio resource allocation/reallocation message, a radio bearer configuration/reconfiguration message and a counting message.

8. The base station as defined in the claim 7, wherein the receiver receives the signaling message from the MCE via a M2 interface.

9. The base station as defined in the claim 7, wherein the MCE is located outside of the base station or within the base station.

10. The base station as defined in the claim 7, further comprising:
a transmitter configured to transmit a corresponding air interface message to a mobile station in a next modification period after the time indicated by the activation time information contained in the signaling message.

11. The base station as defined in the claim 7, further comprising:
a transmitter configured to transmit a corresponding air interface message to a mobile station at the time indicated by the activation time information contained in the signaling message.

12. An MBMS control entity (MCE) comprising:
wherein the MCE is configured to receive activation time information via a M3 interface; and
a transmitter configured to transmit a message comprising the activation time information towards a base station via a M2 interface.

13. A gateway comprising:
a transmitter configured to transmit a message comprising activation time information towards an MBMS control entity (MCE) via a M3 interface.

14. An MBMS control entity (MCE) comprising:
a receiver configured to receive a message with activation time information via a M3 interface; and
a transmitter configured to forward the message via a M2 interface towards a base station.

15. A gateway comprising:
a transmitter configured to transmit a specific message including a session start/stop message, a MBMS control channel (MCCH) configuration/reconfiguration message, a radio resource allocation/reallocation message, a radio bearer configuration/reconfiguration message and a counting message towards a MBMS control entity (MCE) via an M3 interface.

16. An MBMS control entity (MCE) comprising:
a transmitter configured to transmit a specific message including a session start/stop message, a MBMS control channel (MCCH) configuration/reconfiguration message, a radio resource allocation/reallocation message, a radio bearer configuration/reconfiguration message and a counting message towards a base station.

17. A base station comprising:
a receiver configured to receive a signaling message with activation time information via a M2 interface; and
wherein the base station is configured to make the signaling message take effect in the base station synchronously at a time indicated by the activation time information contained in the signaling message.

* * * * *